No. 773,609. Patented November 1, 1904.

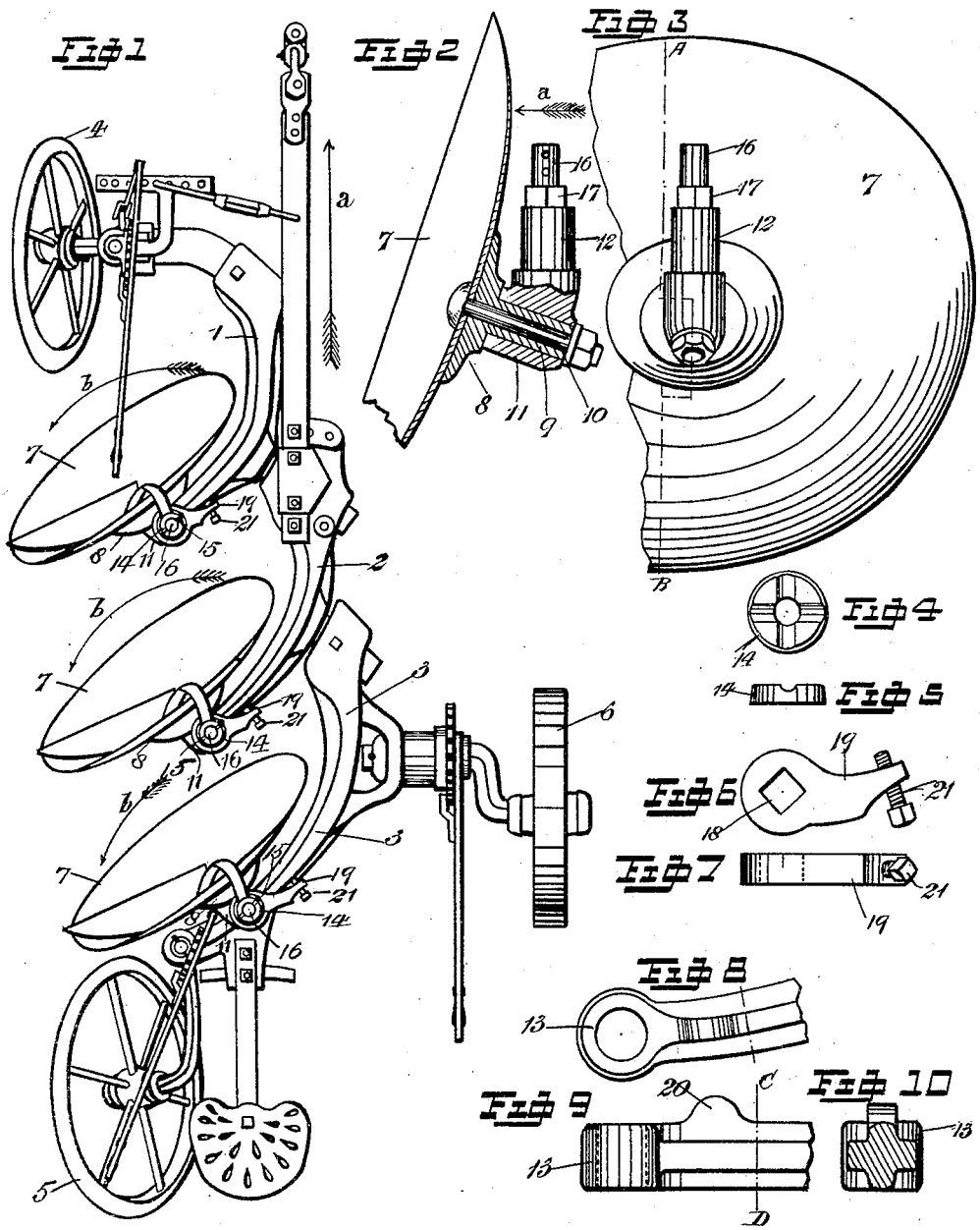

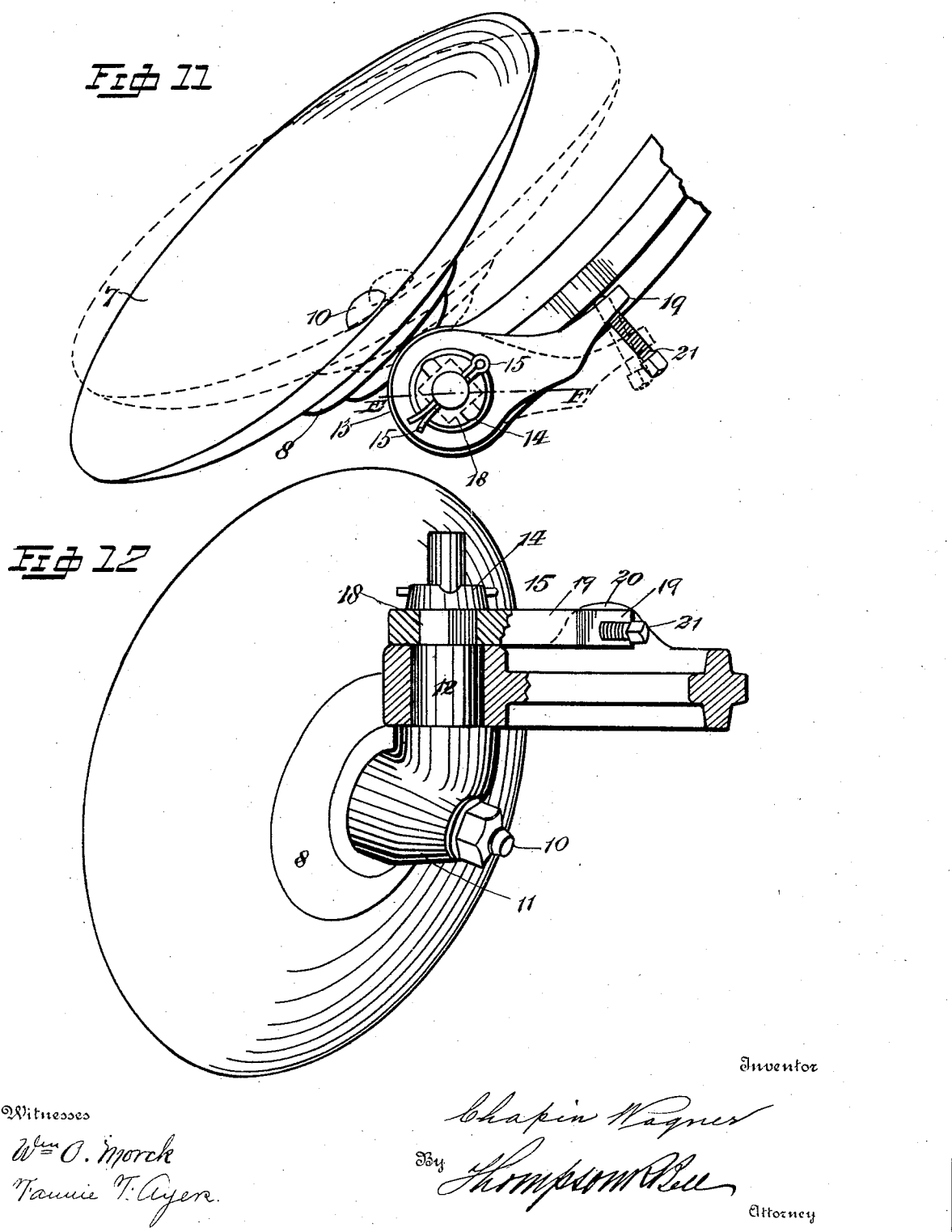

UNITED STATES PATENT OFFICE.

CHAPIN WAGNER, OF INDIANAPOLIS, INDIANA.

DISK ADJUSTMENT FOR PLOWS.

SPECIFICATION forming part of Letters Patent No. 773,609, dated November 1, 1904.

Application filed July 7, 1903. Serial No. 164,576. (No model.)

*To all whom it may concern:*

Be it known that I, CHAPIN WAGNER, a citizen of the United States, residing at Indianapolis, in the county of Marion and State of Indiana, have invented new and useful Improvements in Disk Adjustments for Plows, of which the following is a specification.

My invention relates to certain new and useful improvements in a disk plow; and it consists in means whereby the plow-disks may be adjusted to various angles to cut different widths of furrows and whereby said disks will be secured in position at any required angle or different angles to prevent them being moved out of such adjusted positions by the opposing frictional force of the earth which is being cut and turned over by said disks, as will be hereinafter more fully described, and particularly pointed out in the claims.

The object of this invention is to provide a means for accurately adjusting the angles of the plow-disks to cut wider or narrower strips of furrow in the earth, as required, and to construct such adjusting means in such a manner as to be wholly protected from stubble or other such matter projecting from the ground, which projecting matter it is found in practice is readily caught by any projecting or unprotected mechanism and collected on the machine until a large mass is accumulated, which mass prevents the proper working of the plow-disks and materially increases the resistance of the plow, requiring greater traction force to operate it. I attain these objects by means of the device illustrated in the accompanying drawings, in which similar numerals of reference designate like parts throughout the several views.

Figure 1 is a plan view of a disk plow, showing my improvement in the means for adjusting the disks of the plow applied thereto. Fig. 2 is an enlarged detail sectional view of a disk, taken through the line A B. (See Fig. 3.) Fig. 3 is a view of the back of a disk and looking in the direction of the arrow *a*. (See Fig. 2.) Fig. 4 is an enlarged detail plan view of a disk-plow washer. Fig. 5 is a side view of the same. Fig. 6 is an enlarged detail plan view of the disk-adjusting lever. Fig. 7 is a side view of the same. Fig. 8 is an enlarged broken detail view of a portion of the frame, showing the disk-post bearing. Fig. 9 is an elevational view of the same. Fig. 10 is a sectional view of the same, taken through the line C D. (See Fig. 9.) Fig. 11 is an enlarged detail plan view of a portion of the plow-frame and the disk thereof; and Fig. 12 is an enlarged detail part sectional elevational view of the same, taken through the line E F. (See Fig. 11.)

The main or supporting frame may be of any suitable form of construction; but I prefer to use a sectional frame in connection with my invention, which frame consists of the forward sections 1, intermediate sections 2, and the rear sections 3, which construction of the frame will form the subject-matter of another application the serial number of which is 164,573, and the said plow-frame is provided with a forward furrow-wheel 4, a rear furrow-wheel 5, and a land-wheel 6, and by means of the said wheels said supporting-frame is supported and adjusted as to its height and position relatively to the ground to cause the plow-disks to cut shallower and deeper furrows, as required, and the manner of maintaining said supporting-wheels in position may be accomplished in any suitable manner or by any of the well-known means peculiar to this class of plows and needs no special description.

The plow-disks 7 are dished or of concave form and are of the usual form of construction and have their convex sides bolted to the concaved or large cupped ends 8 of their pivotal stems 9, (shown particularly in Figs. 2, 3, 11, and 12,) and the said disks 7 are securely bolted to said cupped end portions 8 of said pivotal stems 9 by securing-bolts 10, which pass centrally through said disks and through the axes of said pivotal stems 9. (See particularly Fig. 2.) The stems 9 are journaled in their supporting-bearings 11, (see Figs. 2 and 12,) and the latter are formed integral on the pivotal posts 12, which are journaled in bearings 13, formed integral on the sections 1, 2, and 3 of the supporting-frame, and said pivotal posts 12 are secured in their bearings 13 by means of their retaining-washers 14 and split pins 15. (See Figs. 1, 11, and 12.) The means whereby the plow-disks are adjusted to various angles independently of each other and retained at a certain fixed angle only by the resistance of the earth against the disk in the one direction and the counter resistance of the retaining means in the opposite direction and which feature forms the subject-matter of this invention I will now proceed to describe. Intermediate the top end portions 16 and the journal portions 12 of said pivotal posts are formed the square portions 17, upon which are fitted the square eye portions 18 of the disk retaining and adjusting-lever arms 19, and the said adjusting lever-arms 19 are retained in their positions on the square portions 17 of the posts 12 by their retaining-collars 14 and their split pins 15. (See particularly Fig. 12.) The retaining-lugs 20, which also perform the function of guards for protecting said levers from obstructions situated on or projecting from the ground and preventing said obstructions contacting said levers and being taken up and caught by them, are formed integral on the sections 1, 2, and 3 of the frame, and all of which are similar in form and provided for the same purpose (see particularly Figs. 8 and 9) and also for the purpose of providing a means against which the adjusting set-screws 21 bear or abut. The adjusting set-screws 21 are screwed into the tapped reduced ends of the adjusting-levers 19, so that when it is necessary to increase the angle of any one of the disks all that is necessary to be done is to turn the set-screw 21 until that particular disk has been turned or moved the requisite degree of angle. (See particularly Fig. 11.) It will be particularly noted that the resisting force of the earth against the disks when a plow is moved in the direction indicated by the arrow $a$ (see Fig. 1) will tend to swing the disks in the direction indicated by the arrow $b$, thereby forcing the adjusting-screws 21 tightly against their bearing-lugs 20, and thus it will be seen that it is not necessary to provide a means for holding said levers 19 securely to prevent their movement in the opposite direction, since the tendency of the disks 7 is to turn in the direction indicated by the arrows $b$ and in that direction only—that is, against the thrust of their set-screws 21. It will also be noted that by the simple means of adjustment described a very accurate adjustment of the angle of any one of the disks may be accomplished, which is very desirable, since a slight change in the angularity of the setting of a disk causes a material and multiplied change in the width of the furrow to be plowed. It will also be seen that owing to the particular form of the supporting-frame the disk-adjusting levers 19 are situated so as to fall to the rear of the lugs 20, which lugs owing to their positions protect said levers from obstructions over which the plow is drawn, and thus the adjustment of the angle of the disks is not disturbed or in any way affected. It has also been found in practice that the plow-disks are soon worn to a reduced diameter by the action or friction of gritty earth, and were there no means of adjusting the cutting-angles of the said disks the furrows would gradually be reduced in width as the said disks become reduced in diameter, and in order to compensate for this reduction of diameters of the disks and the resulting narrowing of the furrows the reduced disks are turned to form blunter angles with the lines of direction of the draft, and since this adjustment must be exact and the movement of the disks must necessarily be very small an adjustment means of the character described has been found in practice to be not only the most effective, but also the more simple and convenient.

Having thus fully described this my invention, what I claim as new and useful, and desire to cover by Letters Patent of the United States therefor, is—

1. In a disk plow, the combination with a plow-supporting frame, a series of plow-disks, a series of vertically-extending plow-disk-supporting posts pivotally supported by said frame, radially-extending arms connected at the upper projecting ends of said disk-supporting posts, an adjusting-screw screwed into the tapped ends of each of said radially-extending levers, and guards for the forward side of said lever against which said adjusting-screws abut to prevent said disks rotating in one direction and permitting them to turn a limited extent in the opposite direction, substantially as and for the purpose set forth.

2. In a disk plow, the combination with a plow-supporting frame, a plow-disk, and a vertically-extending disk-supporting post pivotally mounted in said plow-frame, of a radially-extending arm, a vertically-extending guard situated on said frame and in front of said arm and an adjusting-screw screwed into the end of said radially-extending arm to abut said guard, which screw and guard are arranged to permit the free rotation of said disk in one direction a limited extent to permit the plow to be turned without resistance, substantially as set forth.

In testimony whereof I have hereunto set my hand in the presence of two subscribing witnesses.

CHAPIN WAGNER.

Witnesses:
 THOMPSON R. BELL,
 NINA WINTERBERG.